(12) United States Patent
Koizumi

(10) Patent No.: US 9,167,173 B2
(45) Date of Patent: Oct. 20, 2015

(54) IMAGE CAPTURING APPARATUS CONFIGURED TO PERFORM A CYCLIC SHOOTING OPERATION AND METHOD OF CONTROLLING THE SAME

(71) Applicant: CANON KABUSHIKI KAISHA, Tokyo (JP)

(72) Inventor: Risa Koizumi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/186,202

(22) Filed: Feb. 21, 2014

(65) Prior Publication Data

US 2014/0267815 A1 Sep. 18, 2014

(30) Foreign Application Priority Data

Mar. 15, 2013 (JP) .................................. 2013-054138

(51) Int. Cl.
*H04N 5/235* (2006.01)

(52) U.S. Cl.
CPC ........... *H04N 5/2355* (2013.01); *H04N 5/2357* (2013.01)

(58) Field of Classification Search
CPC .......................... H04N 5/2357; H04N 5/2355
See application file for complete search history.

(56) References Cited

U.S. PATENT DOCUMENTS

| | | | | |
|---|---|---|---|---|
| 5,966,174 A * | 10/1999 | Yamamoto et al. | ........... | 348/319 |
| 8,488,051 B2 * | 7/2013 | Yokoi | ........... | 348/349 |
| 8,670,043 B2 * | 3/2014 | Shinmei et al. | ........... | 348/228.1 |
| 8,890,975 B2 * | 11/2014 | Baba et al. | ........... | 348/228.1 |
| 2008/0284870 A1 * | 11/2008 | Yokoi | ........... | 348/228.1 |
| 2009/0002520 A1 * | 1/2009 | Yoshida et al. | ........... | 348/226.1 |
| 2011/0317028 A1 * | 12/2011 | Shinmei et al. | ........... | 348/223.1 |
| 2012/0002074 A1 * | 1/2012 | Baba et al. | ........... | 348/228.1 |
| 2013/0271623 A1 * | 10/2013 | Jo | ........... | 348/226.1 |
| 2014/0153839 A1 * | 6/2014 | Tsuzuki | ........... | 382/254 |

FOREIGN PATENT DOCUMENTS

JP 06-273354 A 9/1994

* cited by examiner

*Primary Examiner* — Nicholas Giles
(74) *Attorney, Agent, or Firm* — Cowan, Liebowitz & Latman, P.C.

(57) ABSTRACT

An image capturing apparatus comprises an image capturing unit configured to repeatedly perform cyclic shooting operation including shooting with a first exposure condition and a second exposure condition different from the first exposure condition; and a correction unit configured to detect a first flicker among frames shot with the first exposure condition and perform flicker correction for a frame shot with the first exposure condition based on the first flicker and to detect a second flicker among frames shot with the second exposure condition and perform flicker correction for a frame shot with the second exposure condition based on the second flicker.

6 Claims, 7 Drawing Sheets

IMAGE CAPTURING APPARATUS CONFIGURED TO PERFORM A CYCLIC SHOOTING OPERATION AND METHOD OF CONTROLLING THE SAME

BACKGROUND OF THE INVENTION

1. Field of the Invention

The present invention relates to a technique of generating an image having a wide dynamic range by composing a plurality of images shot with different exposures.

2. Description of the Related Art

Recently, in order to implement a dynamic range exceeding the dynamic range of an image sensor formed from a CCD or CMOS, a technique called HDR (High Dynamic Range) composition is proposed. HDR composition is a technique of generating an image having a wide dynamic range by shooting a plurality of images with little highlight-detail losses and a plurality of images with little shadow-detail losses with different exposure conditions and composing them (see, for example, Japanese Patent Laid-Open No. 6-273354).

In the above HDR composition, however, when, for example, shooting a moving image under a fluorescent lamp, flickers occur in the respective frames to be composed. As a consequence, flickers also occur in the frame after the composition.

SUMMARY OF THE INVENTION

The present invention has been made in consideration of the aforementioned problems, and realizes a technique of generating and recording a high-quality image by HDR composition upon flicker correction in HDR composition.

In order to solve the aforementioned problems, the present invention provides an image capturing apparatus comprising: an image capturing unit configured to repeatedly perform cyclic shooting operation including shooting with a first exposure condition and a second exposure condition different from the first exposure condition; and a correction unit configured to detect a first flicker among frames shot with the first exposure condition and perform flicker correction for a frame shot with the first exposure condition based on the first flicker and to detect a second flicker among frames shot with the second exposure condition and perform flicker correction for a frame shot with the second exposure condition based on the second flicker.

In order to solve the aforementioned problems, the present invention provides a control method of an image capturing apparatus, the method comprising steps of: repeatedly performing cyclic shooting operation including shooting with a first exposure condition and a second exposure condition different from the first exposure condition; and detecting a first flicker among frames shot with the first exposure condition and performing flicker correction for a frame shot with the first exposure condition based on the first flicker, and detecting a second flicker among frames shot with the second exposure condition and performing flicker correction for a frame shot with the second exposure condition based on the second flicker.

According to the present invention, it is possible to generate and record a high-quality image by HDR composition upon flicker correction in HDR composition.

Further features of the present invention will become apparent from the following description of exemplary embodiments (with reference to the attached drawings).

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

Embodiments upon application of the present invention to an image capturing apparatus such as a digital camera for shooting a still image and/or moving image will be described in detail hereinafter with reference to the drawings.

The configuration and functions of an image capturing apparatus according to this embodiment of the present invention is applied will be described below with reference to FIG. 1.

Figure 1:
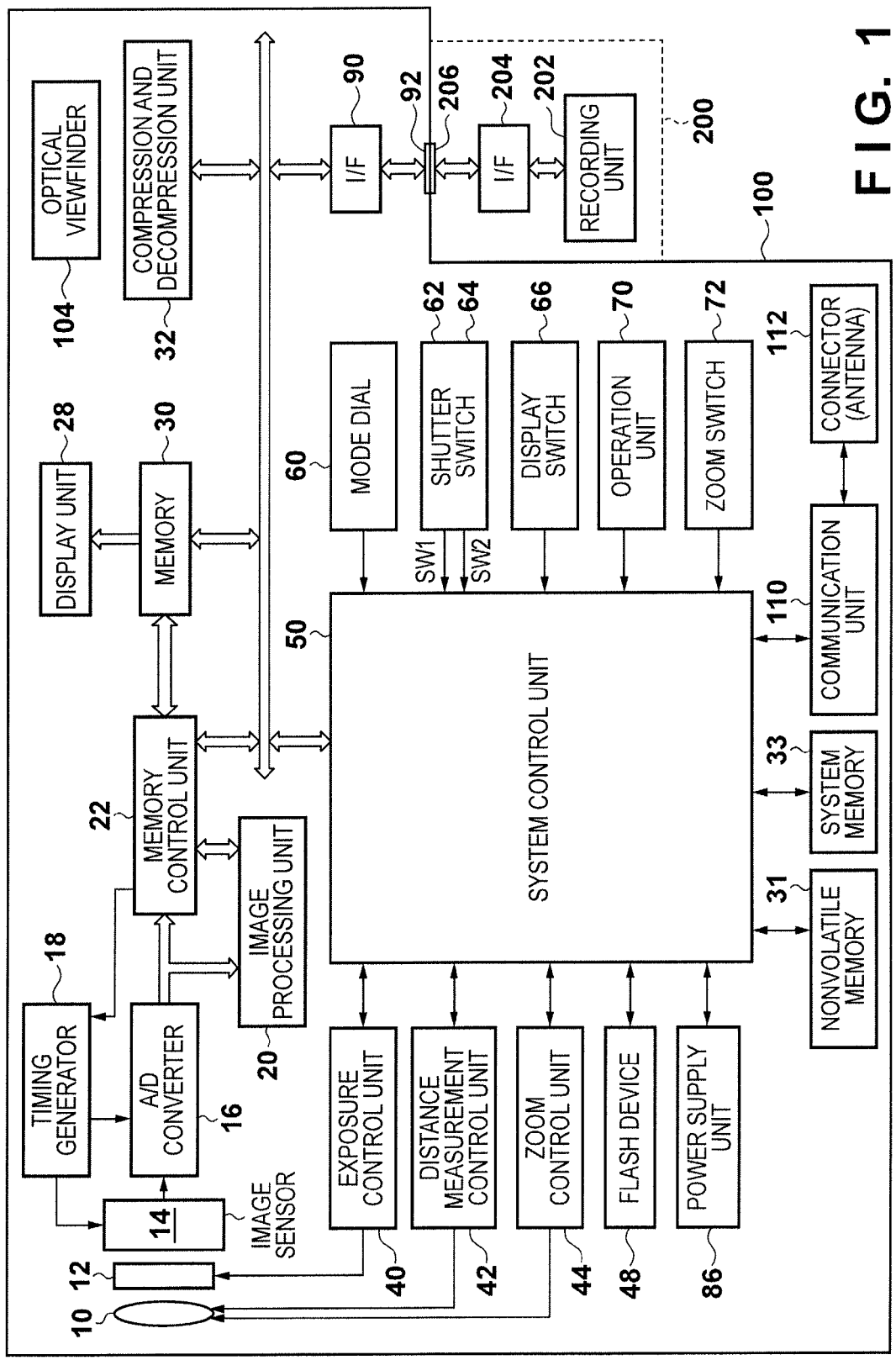
FIG. 1 is a block diagram showing the arrangement of an image capturing apparatus according to an embodiment.

An image capturing apparatus 100 as shown in FIG. 1 comprises a shooting lens 10, a mechanical shutter 12 provided with aperture diaphragm function, an image sensor 14 that converts an optical image into an electrical signal, and an A/D converter 16 that converts an analog signal output from the image sensor 14 into a digital signal. A timing generator 18 supplies clock signals and control signals to the image sensor 14 and A/D converter 16, under the control of a memory control unit 22 and system control unit 50. Note that controlling the reset timing of the image sensor 14 in addition to the mechanical shutter 12 can provide an electronic shutter which can control the accumulation time and can be used for moving image shooting and the like.

An image processing unit 20 performs predetermined processing, such as pixel interpolation and color conversion, on data from the A/D converter 16 or on data from the memory control unit 22. An electronic zoom function is implemented by the image clipping and resizing processing of the image processing unit 20. The image processing unit 20 also performs predetermined calculation processing using captured image data and supplies the calculation results to the system control unit 50. The system control unit 50 controls an exposure control unit 40 and a distance measurement control unit 42, based on the obtained calculation results, so as to perform AF (autofocus) processing, AE (auto-exposure) processing, and EF (flash pre-emission) processing of TTL (Through the Lens) type. The image processing unit 20 also performs AWB (auto white balance) processing of TTL type using the calculation results of the captured image data.

A memory control unit 22 controls the A/D converter 16, the timing generator 18, the image processing unit 20, a memory 30, and a compression and decompression unit 32. The data from the A/D converter 16 is directly written into the memory 30 via both the image processing unit 20 and the memory control unit 22 or via the memory control unit 22.

A display unit 28 is configured of a TFT-LCD or the like. The image data written to the memory 30 for display is supplied to the display unit 28 via the memory control unit 22, whereby an image is displayed on the display unit 28. An electronic viewfinder function can be implemented by successively displaying captured images using the display unit 28. The display unit 28 can be turned on and off arbitrarily by the control of the system control unit 50. A power consumption of the apparatus can be sufficiently reduced when the display unit 28 is turned off.

The memory 30 stores captured still images and moving images. The memory 30 has a storage capacity that is sufficient for storing a predetermined number of still images as well as moving images for a predetermined time period. With the use of this memory 30, it is possible to quickly write large numbers of images even in those cases such as during continuous shooting in which multiple still images are captured successively, during panoramic shooting, and so on.

A nonvolatile memory 31 is, for example, an EEPROM, which is electrically erasable and recordable. In the nonvolatile memory 31, constants and programs, for example, for operating the system control unit 50 are stored. In this context, "programs" may refer to programs for executing various types of flowcharts that will be described later.

The system control unit 50 is a calculation processing device for overall controlling the entire apparatus, and realizes, by executing the programs stored in the nonvolatile memory 31, the procedures of the flowcharts that will be described later. The system memory 33 is, for example, a RAM and used also as a work memory where constants and variables for operating the system control unit 50, and the programs read out from the nonvolatile memory 31 are expanded. The system control unit 50 controls the memory 30, the display unit 28, and the like, so as to perform display control.

A compression and decompression unit 32 compresses and decompresses image data using an ADCT (adaptive-discrete-cosine transform) or the like. The compression and decompression unit 32 reads images stored in the memory 30, performs a compression or decompression processing thereon, and then writes the processed data back into the memory 30.

An exposure control unit 40 that controls the mechanical shutter 12, and also implements flash dimmer function through cooperation with a flash device 48.

A distance measurement control unit 42 controls a focus of the shooting lens 10. A zoom control unit 44 controls a zoom of the shooting lens 10.

A flash device 48 has AF-auxiliary-light projector function and flash-light control function.

The exposure control unit 40 and distance measurement control unit 42 are controlled using the TTL type. The system control unit 50 controls the exposure control unit 40 and the distance measurement control unit 42 based on the calculation results of the captured image data by the image processing unit 20.

A system control unit 50 controls the entire image capturing apparatus 100.

Operation devices 60, 62, 64, 66, 70, and 72 are provided for inputting various operational instructions into the system control unit 50; they are each configured of one or a combination of switches, dials, a touch panel, a pointing device that uses vision detection, a voice recognition device, or the like.

These operation devices will be specifically explained here.

A mode dial switch 60 switches between functional modes, such as power off; automatic shooting mode, manual shooting mode, a panoramic shooting mode, a moving image shooting mode, and HDR moving image shooting mode; and so on.

Reference numeral 62 denotes a shutter switch SW1 that is turned on when a shutter button (not shown) is pressed partway, in order to give instructions to start operations such as AF processing, AE processing, and AWB processing, and so on.

Reference numeral 64 denotes a shutter switch SW2 that is turned on when the above shutter button is pressed fully. When performing flash shooting, the apparatus performs EF processing and then performs exposure on the image sensor 14 for the exposure time determined by AE processing. When performing flash shooting, the apparatus emits light during this exposure period, and causes the exposure control unit 40 to shield against light at the same time as the end of the exposure period, thereby finishing exposure on the image sensor 14. Turning-on of the shutter switch SW2 instructs a start of a series of processing in which signal read from the image sensor 14 is written as image data into the memory 30 via the A/D converter 16 and the memory control unit 22, development processing using calculations performed by the image processing unit 20 and the memory control unit 22; and processing in which image data is read from the memory 30, compressed by the compression and decompression unit 32, and written into the recording medium 200.

A display switch 66 switches the display of the display unit 28. This function blocks power supply to the display unit 28 at the time of shooting with the optical viewfinder 104, thereby reducing power consumption.

An operation unit 70 is made up of various buttons, a touch panel, a rotary dial and so on. The operation unit 70 includes, for example, a menu button; a set button; a macro button; a flash device set button; a single shooting/continuous shooting/self timer switch button; a menu shift+(plus) button; a menu shift−(minus) button; a reproduction image shift+ (plus) button; a reproduction image shift−(minus) button; an image-quality selection button; an exposure correction button, and a date and time set button.

Reference numeral 72 denotes a zoom switch as a zoom operation unit with which the user issues an instruction to change the magnification of a captured image. The zoom switch 72 includes a telephoto switch which changes the capturing field angle toward the telephoto side and a wide-angle switch which changes the capturing field angle toward the wide-angle side. Using the zoom switch 72 will issue an instruction to the zoom control unit 44 to change the capturing field angle of the shooting lens 10, thereby providing a trigger to perform optical zoom operation. The zoom switch 72 also provides a trigger to make the image processing unit 20 perform image clipping and a trigger to perform electronic zoom changing operation for the capturing field angle by image interpolation and the like.

A power supply unit 86 is configured of, for example, primary batteries such as alkaline batteries; secondary batteries such as NiCd batteries, NiMH batteries, and Li-ion batteries; an AC adapter; and so on.

An interface 90 is configured to interface with the recording medium such as the memory card or hard disk. A connector 92 is configured to connect the apparatus to the recording medium such as the memory card or hard disk.

The use of the optical viewfinder 104 makes it possible to capture an image without using the electronic viewfinder function of the display unit 28.

A communication unit 110 has various communication functions such as USB, IEEE1394, LAN, Wireless communication.

A connector 112 or antenna 112 at the wireless communication connects the image capturing apparatus 100 to another device via the communication unit 110.

A recording medium 200 is a device such as a memory card or hard disk. The recording medium 200 comprises a recoding unit 202 such as a semiconductor memory or magnetic disk, an interface 204 that interfaces with the image capturing apparatus 100, and a connector 206 that makes connections to the image capturing apparatus 100.

<HDR Shooting Processing>

Moving image shooting processing for HDR composition according to this embodiment will be described next with reference to FIG. 2. Note that the system control unit 50 implements the processing in FIG. 2 by expanding a control program stored in the nonvolatile memory 31 into the work area of the memory 30 and executing the program.

The following will exemplify, as HDR composition processing, the processing of shooting two images with correct exposure and underexposure and composing them to generate one composite image with a pseudo-expanded dynamic range of the image sensor.

Figure 2:
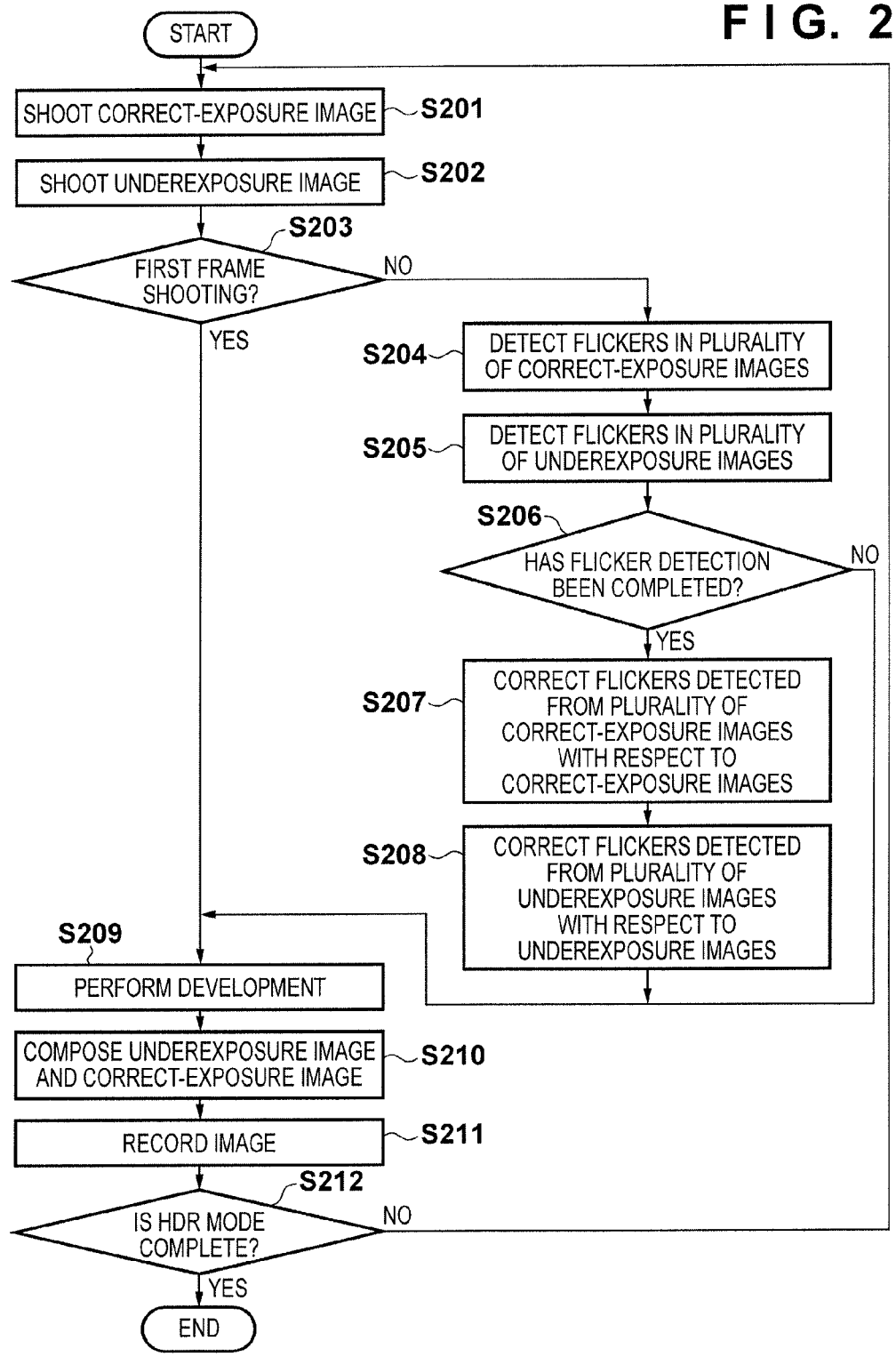
FIG. 2 is a flowchart showing HDR shooting processing according to this embodiment.

Referring to FIG. 2, the system control unit 50 shoots an image with correct exposure (correct-exposure image) in step S201, and shoots an underexposure image in step S202. The system control unit 50 generates an underexposure image by providing an exposure-step relative to a correct-exposure image. In this case, an underexposure image is an image shot at a shutter speed higher than that when a correct-exposure image is shot. It is possible to calculate exposure conditions for a correct-exposure image and an underexposure image by using a known method. For example, the system control unit 50 calculates an exposure condition (first exposure condition) for making an overall image have correct brightness from the luminance distribution of the overall image. In this case, the system control unit 50 may also calculate an exposure condition for making the object have correct brightness, which is detected by using an object detection technique or the like, and calculate an exposure condition with weighting and the like. In addition, an exposure condition (second exposure condition) for an underexposure image is set by, for example, the exposure-step between the exposure condition for a correct-exposure image and a correct exposure. Alternatively, an exposure condition may be fixed or may be automatically determined based on the dynamic range of an image which is estimated from a histogram or the like. The system control unit 50 performs, as one-cycle shooting, shooting with the first and second exposure conditions sequentially calculated in this manner, and repeats such cyclic shooting to generate the respective frames of a moving image for HDR composition.

In step S203, the system control unit 50 determines whether each of the shot correct-exposure image and underexposure image is the first shot frame. If YES in step S203, the process advances to step S209 to develop the correct-exposure image and the underexposure image. In step S210, the system control unit 50 performs composition processing. In step S211, the system control unit 50 performs recording processing. Composition processing will be described later with reference to FIG. 3.

In step S212, the system control unit 50 determines whether the HDR moving image shooting mode has shifted to another mode. If YES in step S212, the system control unit 50 terminates this processing. Otherwise, the process returns to step S201 to shoot a correct-exposure image and an underexposure image.

If the system control unit 50 determines in step S203 that each shot image is the second or subsequent shot frame, the process advances to step S204. The system control unit 50 detects flickers from a plurality of correct-exposure images. A flicker detection method will be described later with reference to FIG. 4.

Subsequently, the system control unit 50 detects flickers from the underexposure images in the same manner as in step S205.

In step S206, the system control unit 50 determines whether the detection of flickers in the respective images is completed by the flicker detection processing in steps S204 and S205. If the system control unit 50 determines in step S206 that the flicker detection is not complete, the process advances to step S209 to perform development processing. The subsequent processing is the same as that for the first frame shooting.

In contrast, if the system control unit 50 determines in step S206 that the flicker detection is complete, the process advances to step S207. The system control unit 50 corrects the flickers detected in step S204 with respect to the correct-exposure image shot with the same correct exposure.

In step S208, the system control unit 50 performs the same processing as that in step S207 with respect to the underexposure image. In step S209, the system control unit 50 develops the correct-exposure image and the underexposure image which have undergone the correction processing. The subsequent processing is the same as that for the first frame shooting.

Figure 3:
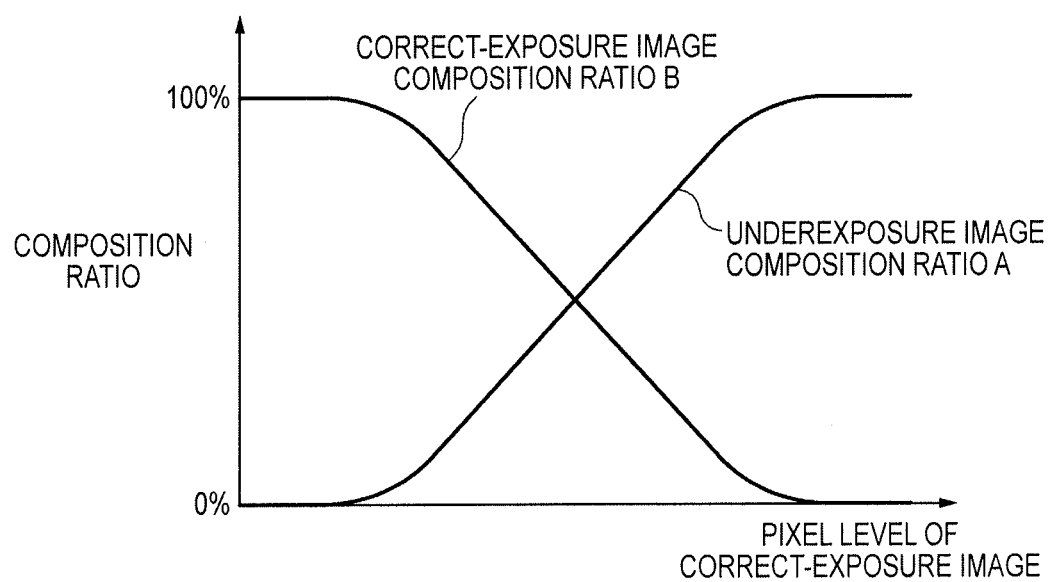
FIG. 3 is a graph exemplifying an HDR composition ratio table according to this embodiment.

FIG. 3 shows a composition ratio table in HDR composition processing.

When performing HDR composition, the apparatus shoots two types of images, that is a correct-exposure image and an underexposure image and obtains a composition ratio by referring to the underexposure image. The apparatus determines a composition ratio for each pixel by referring to the composition ratio table in accordance with the level of each pixel of the underexposure image, and performs image composition processing based on the following equation.

$$PixOut[x,y]=PixL[x,y] \times A + PixM[x,y] \times B$$

PixOut[x, y]: output after composition

PixL[x, y]: underexposure image

PixM[x, y]: correct-exposure image

A: underexposure image ratio (reference to composition ratio table)

B: correct-exposure image ratio (reference to composition ratio table)

As shown in FIG. 3, a composition ratio is determined depending on the pixel level of an underexposure image. When a pixel level of the underexposure image is low, the luminance level of a corresponding pixel is very low. The apparatus therefore sets a relatively high composition ratio from the correct-exposure image and a relatively low composition ratio from the underexposure image. In contrast to this, when a pixel level of the correct-exposure image is high, the luminance level of a corresponding pixel is very high. The apparatus therefore sets a relatively high composition ratio from the underexposure image and a relatively low composition ratio from the correct-exposure image. Executing image composition processing in this manner can generate an image with a wide dynamic range from images obtained with one type of exposure.

<Flicker Correction Processing>

Figure 4:
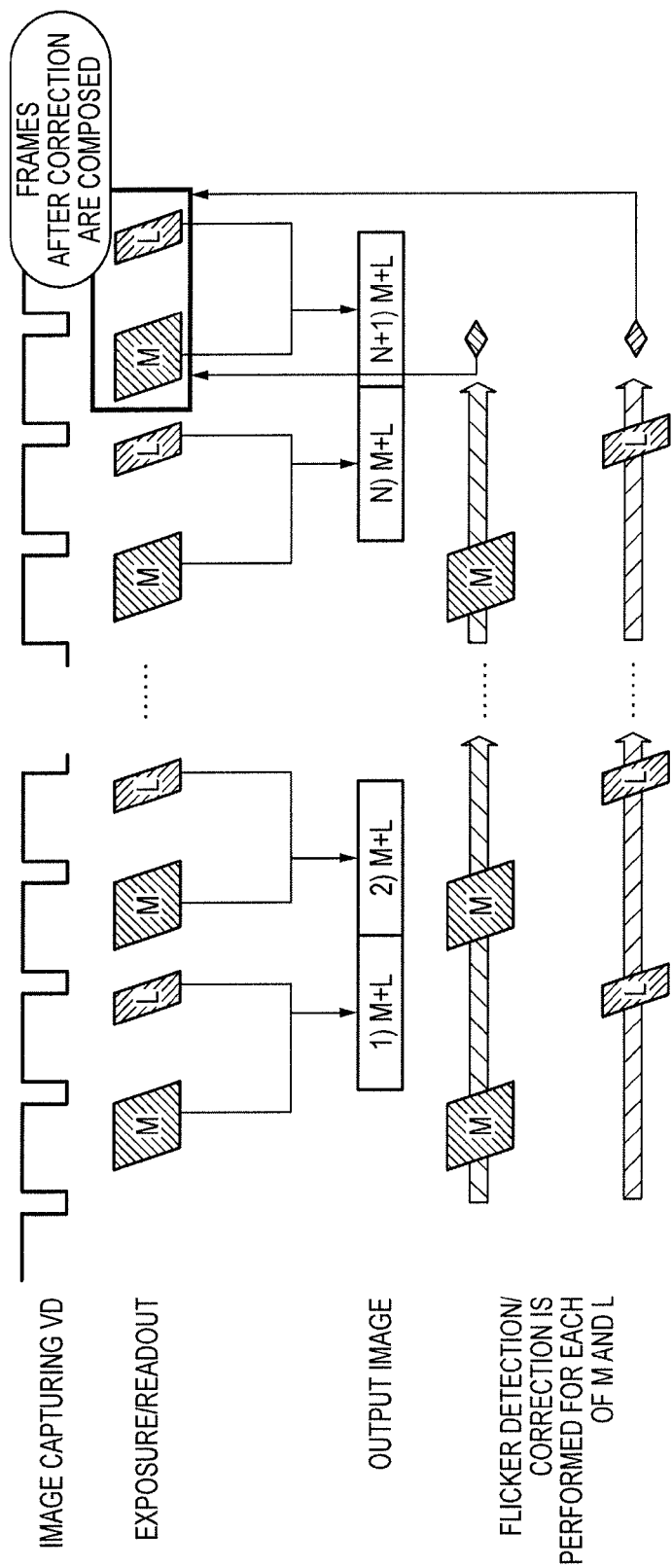
FIG. 4 is a timing chart showing flicker correction processing according to this embodiment.

The processing of detecting and correcting flickers according to this embodiment will be described next with reference to FIG. 4.

In this embodiment, the apparatus alternately generates correct-exposure images and underexposure images and detects flickers in the correct-exposure images among themselves and flickers in the underexposure images among themselves.

According to a calculation method at the time of detection of flickers, first of all, the apparatus corrects an average luminance level based on accumulation time differences by using the calculation expressed by equation (1), and detects a flicker component for each pixel.

$$F(h, v) = \frac{S(h, v)}{S'(h, v)} \times \frac{Tv2}{Tv1} \quad (1)$$

where F(h, v) represents a flicker component, S(h, v) represents this image, S'(h, v) represents an auxiliary image, h and v respectively represent the x- and y-coordinates of each image, Tv1 represents the accumulation time of the image, and Tv2 represents the accumulation time of the auxiliary image. The apparatus then extracts a flicker characteristic parameter for each column with respect to the detected flicker components by Fourier transform represented by:

$$Y_{Re}(f) = \sum_{v=0}^{N-1} y(v) \times \cos\left(\frac{2\pi}{N} \times f \times v\right) \quad (2)$$

$$Y_{Im}(f) = \sum_{v=0}^{N-1} y(v) \times \sin\left(\frac{2\pi}{N} \times f \times v\right) \quad (3)$$

$$Y(f) = \sqrt{Y_{Re}(f)^2 + Y_{Im}(f)^2} \quad (4)$$

where y(v) represents the value of a flicker component at the hth pixel in the horizontal direction and the with pixel in the vertical direction, f represents a frequency, YRe(f) and YIm(f) respectively represent the real part and imaginary part obtained by Fourier transform, and Y(f) represents an amplitude component, which is the intensity of the detected flicker.

The apparatus then calculates an amplitude component A by assigning the flicker frequency component f to equation (4), and calculates the phase of the flicker component by the calculation expressed by:

$$\Phi_h = \tan^{-1}\left(-\frac{Y_{Im}}{Y_{Re}}\right) \quad (5)$$

The apparatus then calculates a flicker correction value by the calculation expressed by:

$$Fm = \frac{1}{A\sin(2\pi f v + \Phi_h)} \quad (6)$$

where A represents an amplitude, and f represents the frequency or phase of a flicker component.

If Y(f) is equal to or more than a predetermined value in each of correct-exposure images and underexposure images between a plurality of frames, the apparatus determines that flickers have occurred, and performs flicker correction by multiplying each flicker correction value obtained by calculation by each image signal.

As is obvious from the calculation of flicker components described above, flicker components on images vary in value depending on the exposure time (accumulation time). Therefore, performing flicker detection among correct-exposure images and among underexposure image, which hardly exhibit large changes in exposure time between frames, eliminates the necessity to consider differences in exposure time and hence is advantageous in calculation cost and design cost accordingly. For this reason, this embodiment is configured to perform flicker detection and correction in images obtained with the same exposure conditions (images obtained with the first exposure condition and images obtained with the second exposure condition) calculated by the calculation method with the same exposure conditions.

Second Embodiment

Moving image shooting processing using HDR composition according to the second embodiment will be described next with reference to FIGS. 5A-5B.

Figure 5A:
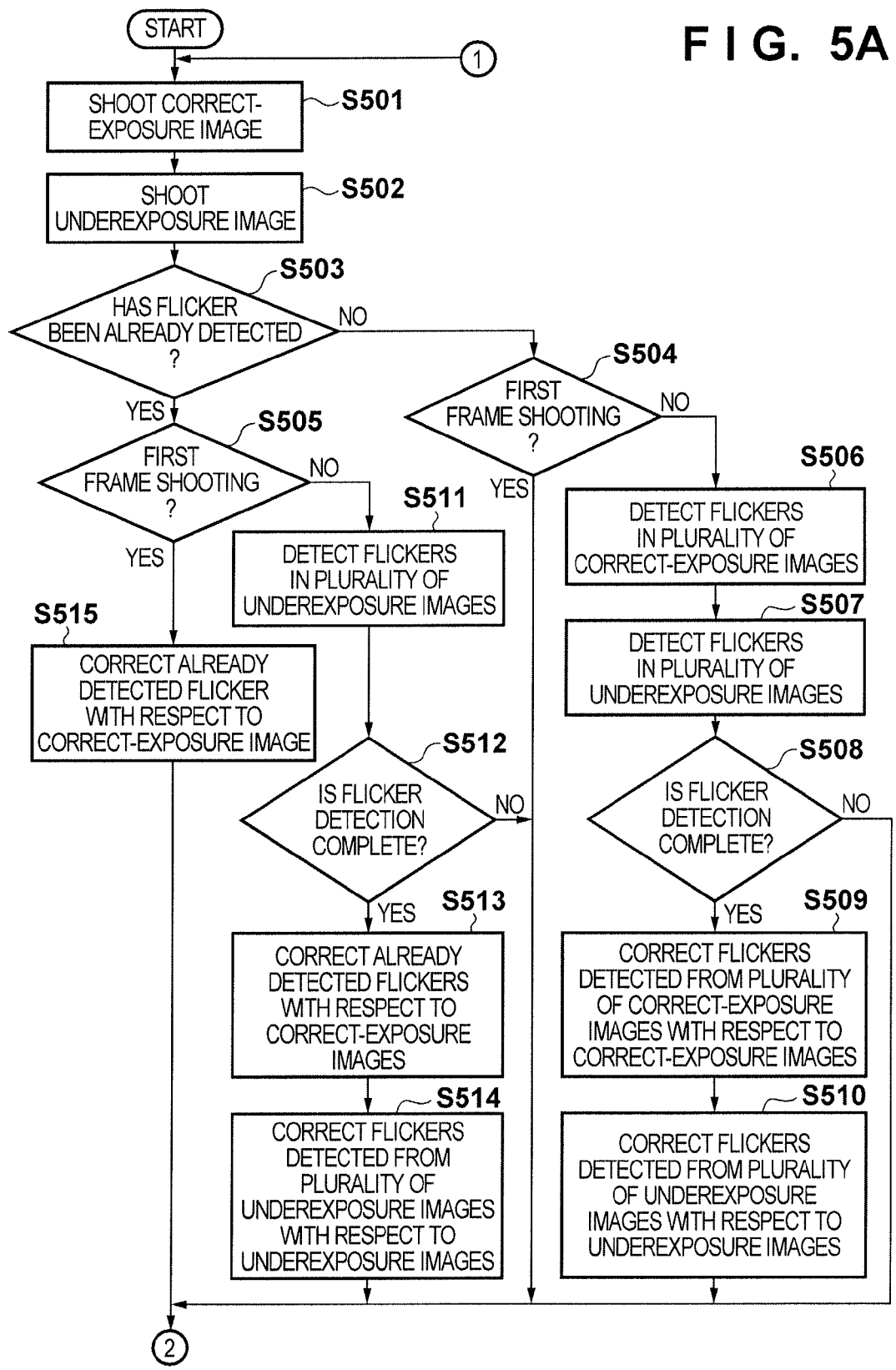
FIGS. 5A and 5B are flowcharts showing HDR composition processing according to the second embodiment.
Figure 5B:
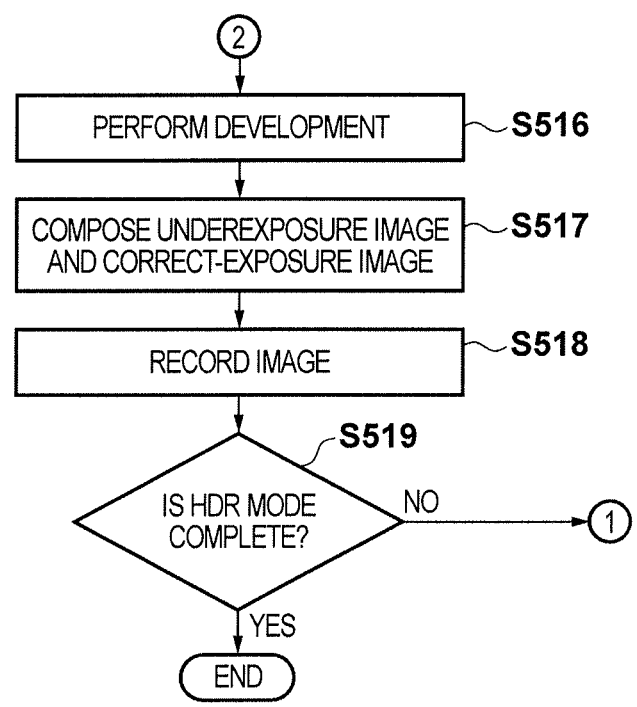

Referring to FIGS. 5A-5B, in steps S501 and S502, a system control unit 50 shoots a correct-exposure image and an underexposure image as in steps S201 and S202 in FIG. 2.

In step S503, the system control unit 50 determines whether it has performed flicker detection at the same shooting rate as that of correct-exposure images, before shifting to the HDR moving image mode. If the system control unit 50 determines in step S503 that no flicker has been detected, the process advances to step S504, in which the system control unit 50 determines whether the currently processed image is the first image after the transition to the HDR mode. The subsequent processing in steps S506 to S510 is the same as that in steps S204 to S208 in FIG. 2.

If the system control unit 50 determines in step S503 that it has already detected a flicker, the process advances to step S505, in which the system control unit 50 determines whether the currently processed image is the first image as in step S504. If the system control unit 50 determines in step S505 that the currently processed image is the first image, the process advances to step S515, in which the system control unit 50 corrects the flicker detected in the correct-exposure image.

Subsequently, in steps S516 to S518, the system control unit 50 performs the same processing as that in steps S209 to S211 in FIG. 2. If the system control unit 50 determines in step S519 that the HDR shooting mode is set, the process returns to step S501, as in the case of step S512. If transition to another mode has occurred, the system control unit 50 terminates this processing.

If the system control unit 50 determines in step S505 that the currently processed image is the second or subsequent image, the process advances to step S511, in which the system control unit 50 performs flicker detection in a plurality of underexposure images. If the system control unit 50 determines in step S512 that flicker detection is not complete, the process advances to step S516.

In contrast, if the system control unit 50 determines in step S512 that flicker detection is complete, the process advances to step S513, in which the system control unit 50 corrects the already detected flicker in the correct-exposure image.

Subsequently, the system control unit 50 corrects the flickers detected from a plurality of underexposure images in step S514 in the underexposure images. The process then advances to step S516.

<Flicker Correction Processing>

Figure 6:
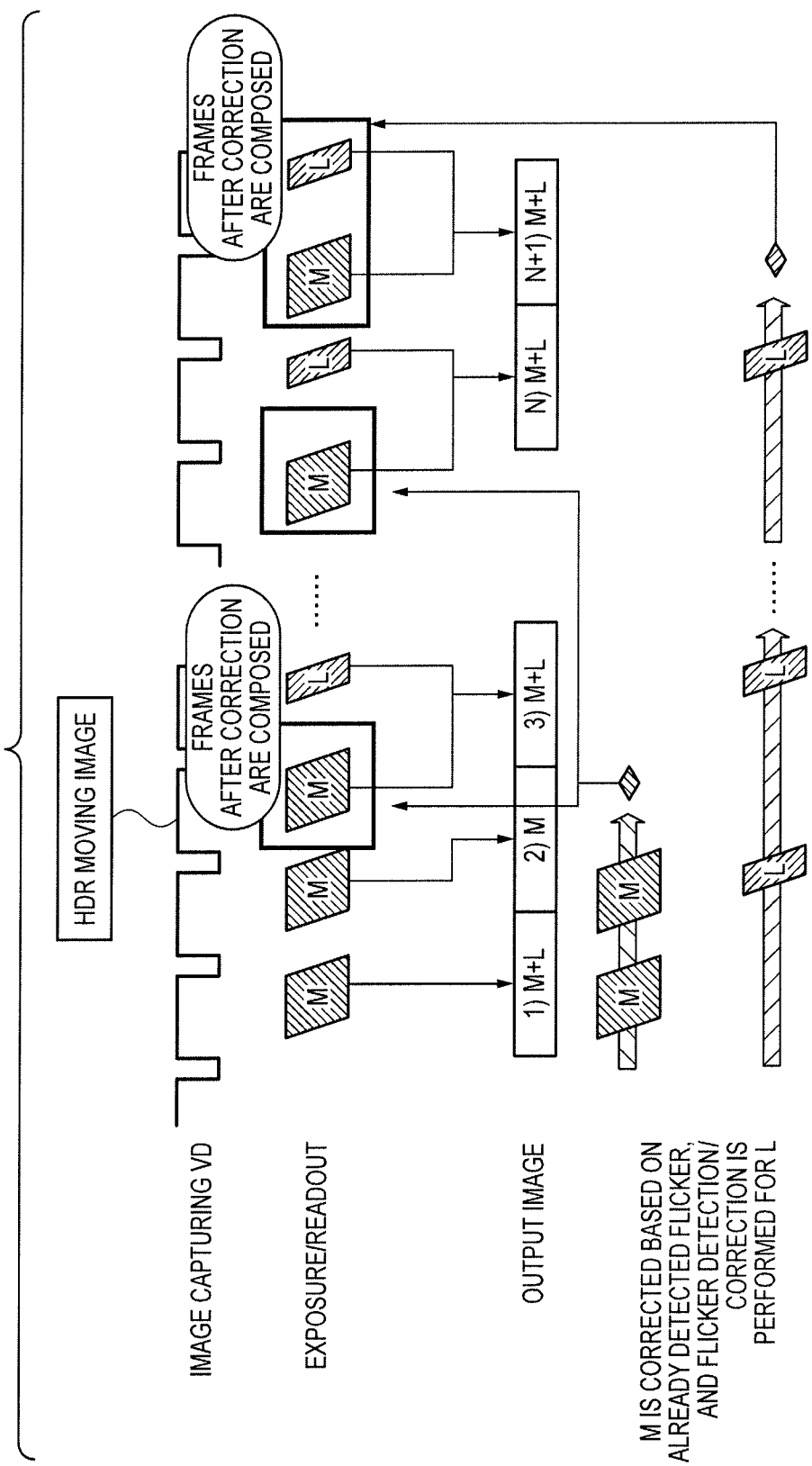
FIG. 6 is a timing chart showing flicker correction processing according to the second embodiment.

The processing of detecting and correcting flickers according to this embodiment will be described next with reference to FIG. 6.

In this embodiment, when transition to the HDR moving image mode occurs, the apparatus alternately generates correct-exposure images and underexposure images, and corrects already detected flickers in the correct-exposure images. The apparatus composes corrected correct-exposure images and underexposure images until the end of flicker detection in underexposure images. Upon completing flicker detection among underexposure images, the apparatus performs flicker correction for each image and then composes the images. Flicker detection and a correction value calculation method are the same as those in the first embodiment.

This embodiment uses correct-exposure images and underexposure images when performing HDR composition. However, the embodiment may use correct-exposure images and overexposure images or correct-exposure images, underexposure, and overexposure images.

In addition, when generating underexposure images from correct-exposure images upon executing exposure correction, the apparatus changes the shutter speed. However, it is possible to generate underexposure images by changing the gain or aperture. In this case, a correct-exposure image and an underexposure image may become equal in shutter speed. If a correct-exposure image and an underexposure image are equal in shutter speed, the apparatus may perform flicker detection in only of one of them, and apply the detection result to both the correct-exposure image and the underexposure image.

Note that if a correct-exposure image and an underexposure image are equal in exposure time, a flicker detection result on one of the frames may be used for correction of the other frame.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-054138, filed Mar. 15, 2013 which is hereby incorporated by reference herein in its entirety.

What is claimed is:

1. An image capturing apparatus comprising:
   an image capturing unit configured to repeatedly perform cyclic shooting operation including shooting with a first exposure condition and a second exposure condition different from the first exposure condition; and
   a correction unit configured to detect a first flicker among frames shot with the first exposure condition by comparing the temporally preceding and succeeding frames and perform flicker correction for a frame shot with the first exposure condition based on the first flicker and to detect a second flicker among frames shot with the second exposure condition by comparing the temporally preceding and succeeding frames and perform flicker correction for a frame shot with the second exposure condition based on the second flicker.

2. The apparatus according to claim 1, further comprising an image composing unit configured to generate a composite image by composing frames shot with the first exposure condition and the second exposure condition, which are corrected by the correction unit.

3. The apparatus according to claim 1, wherein the correction unit corrects an already detected flicker without performing flicker detection in a frame exhibiting the same exposure time as that of a frame in which flicker detection has been performed.

4. The apparatus according to claim 1, wherein if the first exposure condition and the second exposure condition are equal in exposure time, the correction unit performs flicker correction for the frames shot with both the first exposure condition and the second exposure condition based on a flicker detected from a frame shot with one of the exposure conditions.

5. A control method of an image capturing apparatus, the method comprising steps of:
   repeatedly performing cyclic shooting operation including shooting with a first exposure condition and a second exposure condition different from the first exposure condition; and
   detecting a first flicker among frames shot with the first exposure condition by comparing the temporally preceding and succeeding frames and performing flicker correction for a frame shot with the first exposure condition based on the first flicker, and detecting a second flicker among frames shot with the second exposure condition by comparing the temporally preceding and succeeding frames and performing flicker correction for a frame shot with the second exposure condition based on the second flicker.

6. A non-transitory computer-readable storage medium storing a program for causing a computer to execute the control method according to claim 5.

* * * * *